(12) United States Patent
Hurst et al.

(10) Patent No.: US 7,849,497 B1
(45) Date of Patent: Dec. 7, 2010

(54) METHOD AND SYSTEM FOR ANALYZING THE SECURITY OF A NETWORK

(75) Inventors: David Hurst, Chicago, IL (US); Vijaya Raghavan, Bangalore (IN); Chandrasekhara Reddy Yerasi, Aurora, IL (US)

(73) Assignee: Athena Security, Inc., Lombard, IL (US)

( * ) Notice: Subject to any disclaimer, the term of this patent is extended or adjusted under 35 U.S.C. 154(b) by 966 days.

(21) Appl. No.: 11/639,875

(22) Filed: Dec. 14, 2006

(51) Int. Cl.
G06F 17/00 (2006.01)
H04L 29/06 (2006.01)
(52) U.S. Cl. .......................................... 726/1; 713/153
(58) Field of Classification Search ...................... 726/1; 713/153
See application file for complete search history.

(56) References Cited

U.S. PATENT DOCUMENTS

| | | | |
|---|---|---|---|
| 6,513,721 B1* | 2/2003 | Salmre et al. | 235/492 |
| 6,535,227 B1* | 3/2003 | Fox et al. | 715/736 |
| 6,795,862 B1* | 9/2004 | Keohane et al. | 709/230 |
| 6,990,513 B2* | 1/2006 | Belfiore et al. | 709/203 |
| 7,003,562 B2* | 2/2006 | Mayer | 709/223 |
| 7,596,803 B1* | 9/2009 | Barto et al. | 726/1 |
| 2002/0021675 A1* | 2/2002 | Feldmann | 370/254 |
| 2002/0093527 A1 | 7/2002 | Sherlock et al. | |
| 2002/0118642 A1* | 8/2002 | Lee | 370/230 |
| 2003/0110262 A1* | 6/2003 | Hasan et al. | 709/226 |
| 2004/0019807 A1 | 1/2004 | Freund | |
| 2004/0064727 A1 | 4/2004 | Yadav | |
| 2004/0215978 A1* | 10/2004 | Okajo et al. | 713/201 |
| 2004/0250156 A1* | 12/2004 | Weichselbaum | 714/2 |
| 2005/0268080 A1* | 12/2005 | Quang et al. | 713/1 |
| 2006/0075503 A1* | 4/2006 | Bunker et al. | 726/25 |

(Continued)

OTHER PUBLICATIONS

Al-Shaer et al., "Firewall Policy Advisor for Anomaly Detection, Rules Editing and Translation," IEEE/IFIP Integrated Management IM'2003 (2003).

(Continued)

*Primary Examiner*—Techane J Gergiso
(74) *Attorney, Agent, or Firm*—Drinker Biddle & Reath LLP

(57) ABSTRACT

Described herein are a method and system for analyzing the security of a computer network. According to various implementations, there is a device adapter associated with each device that has a significant impact on the security of the network (e.g., routers, switches, gateways, or "significant hosts"). The device adapter, which may be implemented as a piece of software executing remotely from the device, queries the device to determine what its security settings are (e.g., its firewall rules). The device adapter conducts the query using whichever form of communication the device requires (e.g., telnet, HTTP) and using whichever command set the device requires. Each type of device on the network has a software model associated with it. For example, there may be a router model, a switch model, a firewall model, and a gateway model. The model is made up of a series of rule sets. Each rule set includes rules that are derived from the configuration of the device (obtained by the device adapter). The rules are expressed in a canonical rule set language. A global view of the security policy of the network is generated based on the modeled behaviors of the security devices (i.e., devices that have an impact on security) of the network, and is displayed on a user interface.

16 Claims, 20 Drawing Sheets

U.S. PATENT DOCUMENTS

2007/0157286 A1* 7/2007 Singh et al. .................. 726/1

OTHER PUBLICATIONS

Al-Shaer et al., "Management and Translation of Filtering Security Policies," IEEE International Conference on Communications (May 2003).

Al-Shaer et al., "Discovery of Policy Anomalies in Distributed Firewalls," IEEE INFOCOM'04, pp. 2605-2616 (Mar. 2004).

Al-Shaer et al., "Modeling and Management of Firewall Policies," IEEE Transactions on Network and Service Management, 1(1) (Apr. 2004).

Al-Shaer et al., "Conflict Classification and Analysis of Distributed Firewall Policies," IEEE Journal on Selected Areas in Communications (JSAC), 23(10), pp. 2069-2084 (2005).

Bartal et al., "*Firmato*: A Novel Firewall Management Toolkit," Technical Report EES2003-1, Dept. of Electrical Engineering Systems, Tel Aviv University (2003).

Bellovin, "Distributed Firewalls,";*login*:, pp. 37-39 (Nov. 1999).

Eppstein et al., "Internet Packet Filter Management and Rectangle Geometry," Symp. on Discrete Algorithms, pp. 827-835 (2001).

Eronen et al., "An Expert System for Analyzing Firewall Rules," Proc. of the 6th Nordic Workshop on Secure IT Systems (NordSec 2001), pp. 100-107 (2001).

Hamed et al., "Taxonomy of Conflicts in Network Security Policies," IEEE Communications Magazine, 44(3) (Mar. 2006).

Hazelhurst et al., "Binary Decision Diagram Representations of Firewall and Router Access Lists," Technical Report TR-Wits-CS-1998-3, University of the Witwatersrand, Johannesburg, South Africa (Oct. 1998).

Hazelhurst et al., "Algorithms for Analyzing Firewall and Router Access Lists," Proc. of the International Conference on Dependable Systems and Networks (DSN'00), pp. 576-585 (2000).

Liu et al., "Firewall Queries," Proceedings of the 8th International Conference on Principles of Distributed Systems, LNCS 3544, T. Higashino Ed., Springer-Verlag, pp. 124-139 (Dec. 2004).

Mayer et al., "Fang: A Firewall Analysis Engine," Proc. of IEEE Symp. on Security and Privacy, pp. 177-187 (2000).

Schuba et al., "A Reference Model for Firewall Technology," Spartan Symposium (Mar. 1997).

Wool, "A Quantitative Study of Firewall Configuration Errors," IEEE Computer, 37(6) pp. 62-67 (Jun. 2004).

Wool, "Architecting the Lumeta Firewall Analyzer," Proceedings of the $10^{th}$ USENIX Security Symposium, Washington, D.C. (Aug. 2001).

Xie, et al. "On Static Reachability Analysis of IP Networks," Proceedings of IEEE Infocom'05 (Mar. 2005).

Yuan et al., "Fireman: A Toolkit for Firewall Modeling and Analysis," Proceedings of 2006 IEEE Symposium on Security and Privacy, Oakland, CA, (May 2006).

* cited by examiner

```
[Action] ALLOW
    [Protocol] tcp
        [SrcAddress] 10.20.5.0/24
            [SrcPort] (1024, 65535)
                [DstAddress] 216.27.61.68
                    [DstPort] pop3
                [DstAddress] 216.27.61.67
                    [DstPort] 8080
                    [DstPort] https
                    [DstPort] http
                [DstAddress] 216.27.61.69
                    [DstPort] http
            [SrcPort] (1, 65535)
                [DstAddress] 192.168.102.51
                    [DstPort] 995
                    [DstPort] 993
                    [DstPort] imap4
                    [DstPort] pop3
                    [DstPort] smtp
                [DstAddress] 192.168.102.52
                    [DstPort] http
                [DstAddress] 192.168.102.50
                    [DstPort] 8080
                    [DstPort] https
                    [DstPort] http
[Action] DENY
```

FIG. 10

⊟ [Action] ALLOW
　⊟ [Protocol] tcp
　　⊟ [DstPort] pop3
　　　⊞ [DstAddress] 216.27.61.68
　　　⊞ [DstAddress] 192.168.102.51
　　⊟ [DstPort] 8080
　　　⊞ [DstAddress] 216.27.61.67
　　　⊞ [DstAddress] 192.168.102.50
　　⊟ [DstPort] https
　　　⊞ [DstAddress] 216.27.61.67
　　　⊞ [DstAddress] 192.168.102.50
　　⊟ [DstPort] http
　　　⊞ [DstAddress] 216.27.61.67
　　　⊞ [DstAddress] 216.27.61.69
　　　⊞ [DstAddress] 192.168.102.52
　　　⊞ [DstAddress] 192.168.102.50
　　⊟ [DstPort] 995
　　　⊞ [DstAddress] 192.168.102.51
　　⊟ [DstPort] 993
　　　⊞ [DstAddress] 192.168.102.51
　　⊟ [DstPort] imap4
　　　⊞ [DstAddress] 192.168.102.51
　　⊟ [DstPort] smtp
　　　⊞ [DstAddress] 192.168.102.51
⊞ [Action] DENY

METHOD AND SYSTEM FOR ANALYZING THE SECURITY OF A NETWORK

TECHNICAL FIELD

The invention relates generally to computer network security and, more particularly, to methods and systems that determine the effective security policy between two or more nodes of a network.

BACKGROUND

With the proliferation of computer networks, and with the increase in the number and types of devices that are linked to computer networks, network security has become increasingly important. To enforce security policies, all nodes in the network may have a role to play. For example, even though a network may have a single gateway that regulates the entry and exit of data traffic into and out of the network, each router or switch in the network can augment the security functions of the gateway by enforcing rules regarding the passage of traffic through that router or switch. Thus, the overall security policy of the network is the result of both the security rules enforced by the gateway and the security rules enforced by the routers and the switches.

With multiple devices on a network taking part in security, the task of setting or changing the overall security policy of the network becomes complicated. This is especially true when each of the devices is configured independently from the others. In fact, one of the biggest challenges in trying to establish new security policies on a network is trying to determine what the existing security policy of the network is. This is because each device that is involved in network security has its own settings, and each device's setting may need to be taken into account. Another challenge in setting or changing the security policy of a network is representing the network's existing security policy in a way that is meaningful to a user.

SUMMARY

In accordance with the foregoing, a method and system for analyzing the security of a network is provided. One embodiment of the method involves collecting security configuration settings from each of a plurality of nodes of the computer network; analyzing the security configuration settings; graphically displaying the topology of the network on the user interface; receiving, from a user, a selection of a first node of the plurality of nodes and a second node of the plurality of nodes; generating a security policy for communications between the first and second node based on the results of the analyzing step; and displaying the generated security policy on the user interface.

Another embodiment of the method involves the steps of collecting security configuration settings from a plurality of nodes of the computer network; analyzing the security configuration settings using a plurality of criteria; generating a security policy for a communication between at least two nodes of the plurality of nodes based on the results of the analyzing step; expressing the generated security policy in terms of the plurality of criteria; graphically representing the security policy as a hierarchy, wherein each of the plurality of criteria occupies a level in the hierarchy; receiving a user request to reorder the plurality of criteria within the hierarchy; and based on the user request, repeating the representing step using the reordered plurality of criteria.

Finally, in an embodiment of the invention, a system for analyzing the security of a network includes a computer communicatively linked to the computer network. The computer executes device adapters, a network simulator, and a user interface module. Each device adapter corresponds to a device on the network, and each device adapter opens a communication session with the device using a communication protocol that the device understands and extracts security configuration information from the device including information regarding which types of communication the device allows and which types of communication the device denies. The network simulator defines models for the devices based on the extracted security configuration information and derives a security policy for communication between devices based on the defined models. The security policy is expressed as a set of criteria for admitting and denying communication. The user interface module receives a user's selection of two devices; displays, to the user, the derived security policy in the form of a tree based the rank order of the criteria; receives, from the user, a request to change the rank order of the criteria; and re-displays the tree to the user based on the changed rank order.

BRIEF DESCRIPTION OF THE DRAWINGS

FIGS. 10 & 11 illustrate textual views of a policy tree according to an embodiment of the invention.

FIGS. 12-20 illustrate various aspects of a user interface for a security analysis program according to an embodiment of the invention.

DETAILED DESCRIPTION

The invention is generally directed to a method and system for analyzing the security of a computer network. According to various embodiments of the invention, there is a device adapter associated with each device that has a significant impact on the security of the network (e.g., routers, switches, gateways, or "significant hosts"). The device adapter, which may be implemented as a piece of software executing remotely from the device, queries the device to determine what its security settings are (e.g., its firewall rules). The device adapter conducts the query using whichever form of communication the device requires (e.g., telnet, HTTP) and using whichever command set the device requires. Each type of device on the network has a software model associated with it. For example, there may be a router model, a switch model, a firewall model, and a gateway model. The model is made up of a series of rule sets. Each rule set includes rules that are derived from the configuration of the device (obtained by the device adapter). The rules are expressed in a canonical rule set language. In one embodiment, the rule sets include matching criteria/action rules, filtering action rules, routing rules, transform rules, and control action rules. Using the devices models, a security analysis program determines the effective security policy that is in effect between two or more nodes of the network (e.g., 1-to-1, 1-to-n, n-to-1, or n-to-n nodes). The security analysis program can then display this policy to a user on a graphical user interface in the form of a policy tree. The policy tree is arranged hierarchically, but can be reordered according to the user's preference. This enables the user to view the policy according to the criteria that are the most meaningful to the user. The security analysis program can track changes in the effective security policy, thereby enabling the user to see what impact changes in the network, or changes in the security settings of devices on the network have on security.

Figure 1:
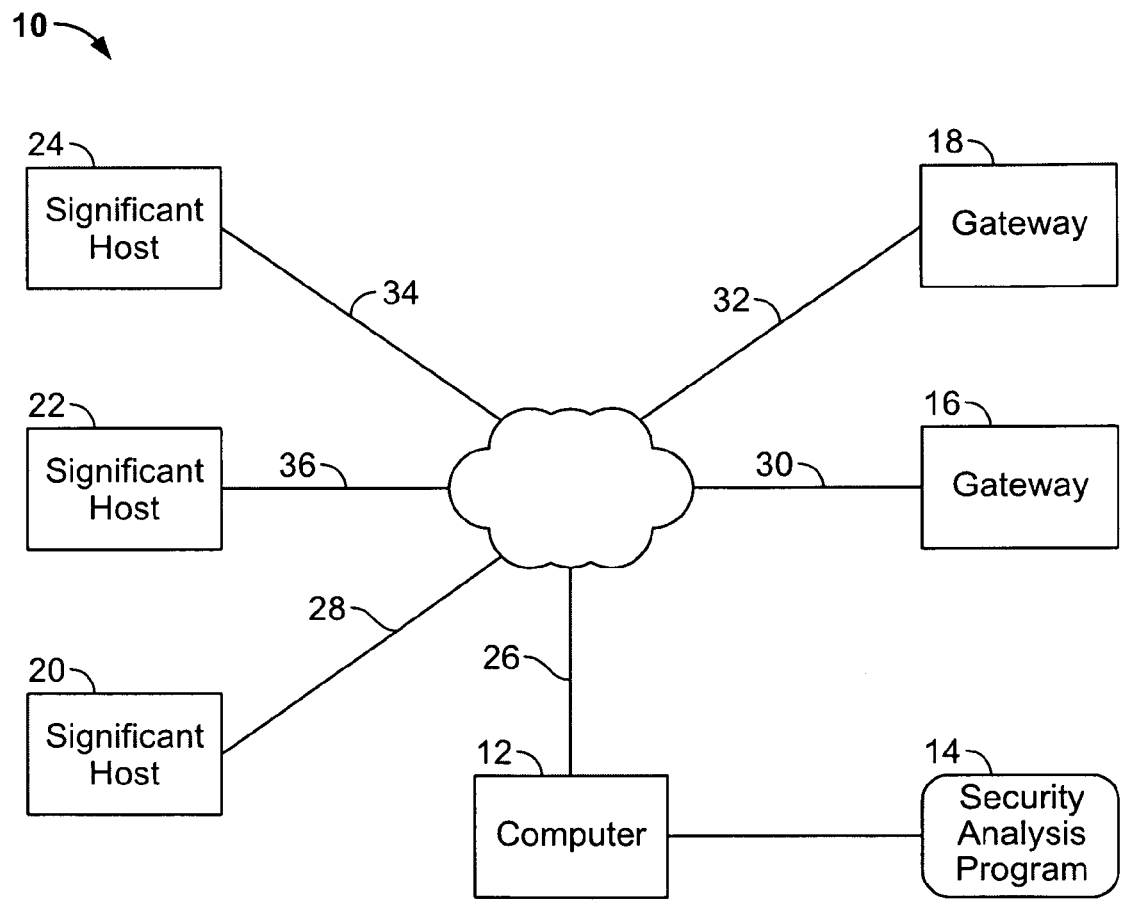
FIG. 1 illustrates a computer network configured according to an embodiment of the invention.

Referring to FIG. 1, an example computer network on which an embodiment of the invention is deployed will now be described. The computer network, generally labeled 10, includes a computer 12 on which security analysis program 14 executes. The computer network 10 also includes first and second gateways 16 and 18, and three "significant hosts" 20, 22 and 24. As used herein, the term "significant host" means any host that stores valuable information assets or executes software that is critical to the operation of the business of the entity that uses the network 10 (including commercial, public/governmental, or non-profit entities). The computer network 10 also includes several segments 26, 28, 30, 32 and 34. Each segment is a communications pathway that may be wired (such as an Ethernet cable) or wireless.

Figure 2:
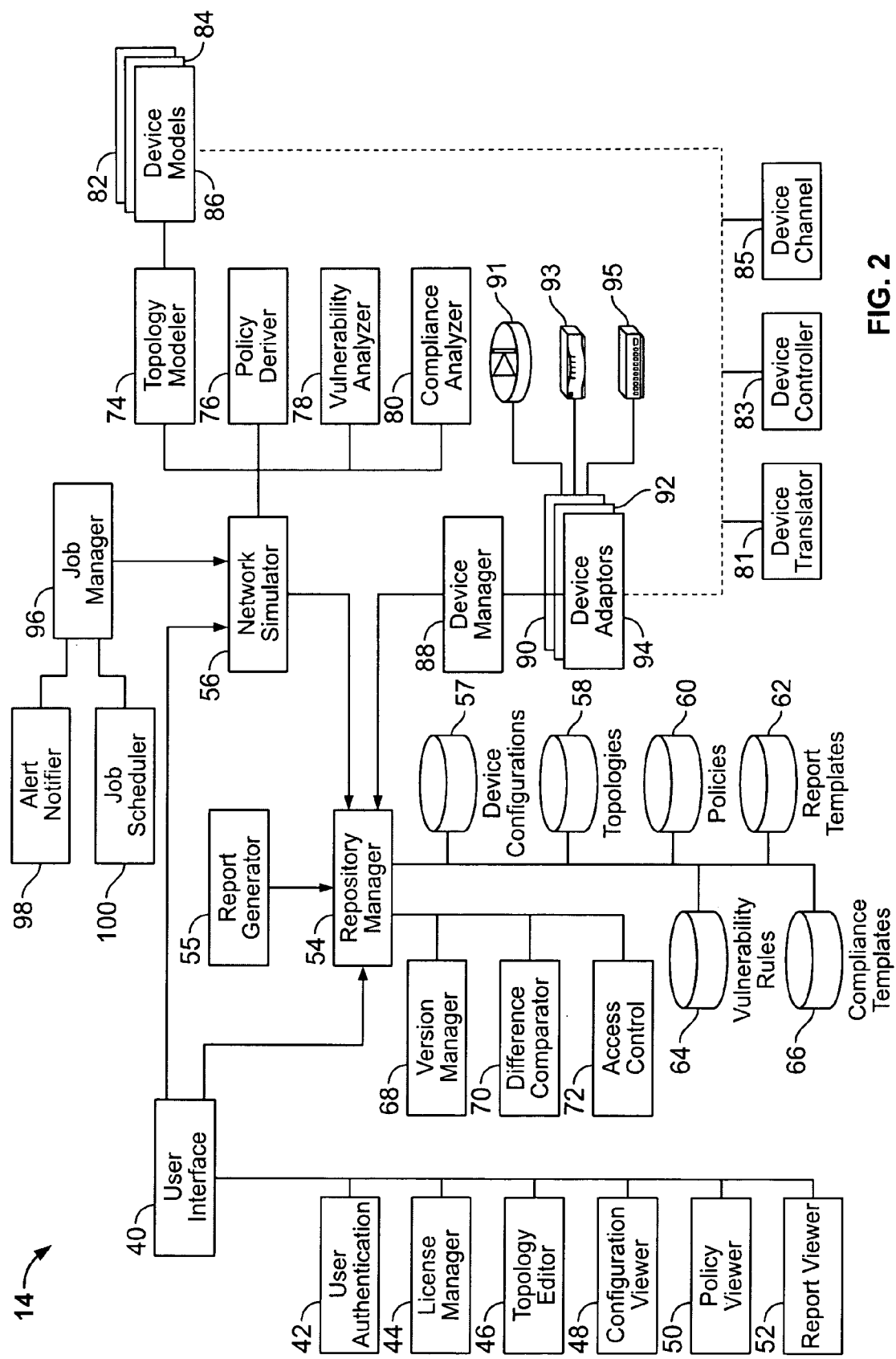
FIG. 2 illustrates the architecture of a security analysis program in accordance with an embodiment of the invention.

Referring to FIG. 2, the architecture for the security analysis program 14 (from FIG. 1) for an embodiment of the invention will now be described. The module with which the user interacts most directly is a user interface module 40. The user interface module 40 includes a user authentication module 42, a license manager 44, a topology editor 46, a configuration viewer 48, a policy viewer 50, and a report viewer 52. The user authentication module 42 authenticates the user through a logon process. The license manager determines whether or not the system upon which the security analysis program 14 executes has a valid license to execute the security analysis program 14. The topology editor 46 permits the user to edit a network topology. The configuration viewer 48 displays the configuration files of various devices on the network 10 in response to input from the user. Similarly, the policy viewer 50 displays the policy or policies generated by the security analysis program 14 based on the configuration settings of various devices on the network 10. The report viewer 52 displays reports that contain information about the security of the network 10. The user interface module 40 interacts with a repository manager 54 and a network simulator 56.

The repository manager 54 stores and retrieves data from one of several databases. These databases include a device configurations database 57, a topologies database 58, a policies database 60, a report templates database 62, a vulnerability rules database 64, and a compliance database 66. The device configurations database 57 contains information regarding the security configuration of various devices in the network 10 (FIG. 1). The topologies database 58 contains data regarding the current topology of the network 10 as well as information regarding past topologies of the network 10. The policies database 60 contains data regarding the security policy of each of the gateways and significant hosts of the network 10. The report templates database 62 contains data regarding the format and content of various reports that the security analysis program generates. The vulnerability rules database 64 contains data regarding criteria by which the security analysis program 14 determines whether the network 10 or portion thereof has a security vulnerability. The repository manager 54 includes a version manager 68, a difference comparator 70, and an access control module 72. The version manager 68 keeps track of different versions of topologies and policies that are stored in the topology database 58 and the policies database 60. The difference comparator 70 compares different versions of topologies and policies that are stored in the topology database 58 and the policies database 60 to permit a user to see a "marked-up" version and to quickly determine what changes were made among different versions. The access control module 72 regulates access to the various databases. A report generator 55 generates reports and sends them to the repository manager 54. Possible reports generated include a report on the policy from external networks, policy to the Internet, policy between internal subnets or geographic locations, implementation of "best practices" in network security policy, security risk profile, and regulatory compliance.

There are many possible ways that the topology information contained in the topologies database 58 can be generated. In one embodiment, the topology is created through a manual process, in which the user identifies all of the network segments and devices that will be used in the topology. The user also creates a network or host definition for each element of the topology. The user then places each network or device on the topology diagram. The user may carry out these tasks via the user interface module 40. The security analysis program 14 then determines the nature of the connections between networks and devices based in part on the network address ranges of the networks and the Internet Protocol (IP) addresses of the network interfaces associated with the devices. In another embodiment, the security analysis program 14 automatically discovers the topology using a conventional topology discovery tool and various network management tools.

The network simulator 56 simulates the network 10 (FIG. 1) using device models. The network simulator 56 includes a topology modeler 74, a policy deriver 76, a vulnerability analyzer 78, and a compliance analyzer 80. The topology modeler 74 models the topology of the network 10 using a set of device models 82, 84 and 86, each of which are built based on a series of rule sets written using a canonical ruleset language. The canonical ruleset language provides a common, device-independent representation of the security devices being modeled. The policy deriver 76 derives the policy or policies that are effectively in place for the various portions of the network 10. In an embodiment of the invention, the policy deriver 76 expresses the policies in terms of the protocol, source address, source port, destination address and destination port of the network communication (e.g., data packets, data frames, or cells). The vulnerability analyzer 78 analyzes the policy or policies derived by the policy deriver 76 and, using data obtained from the vulnerability rules database 64, determines whether there are any security vulnerabilities in the network 10. The compliance analyzer 80 analyzes the policy or policies derived by the policy deriver 76 and, using data obtained from the policies database 60, determines whether or not the effective policy or policies of the network 10 are in compliance with the actual policy (i.e., the policy that the administrator of the network 10 wishes to implement).

The security analysis program 14 further includes a device manager 88, which interacts with the repository manager 54. In an embodiment of the invention, the device manager 88 uses a plug-in architecture in which each type of device that is being modeled on the network 10 has a corresponding device adapter. As new devices are added or needed, new device adapters can be added. The embodiment of FIG. 2 includes device adaptors 90, 92 and 94. Each device adapter includes a device translator 81 that converts the configuration settings of the device into a canonical ruleset language, a device controller 83 that manages communication with the device, a device channel 85 that provides a mechanism for communicating with the device (e.g., Telnet or SNMP), and a device model that describes important aspects of the behavior of the device. In FIG. 2, three instantiated device models 82, 84 and 86 are shown. Additionally, the device translator 81 has a scripting capability, and the appropriate script is run via the appropriate device channel 85. Each device adapter obtains configuration information for its corresponding device. For example, the first device adapter 90 is associated with a device 91 that acts as a firewall; the second device adaptor 92 is associated with a router 93; and the third device adapter 94 is associated with a switch 95.

Finally, the security analysis program 14 includes a job manager 96, which interacts with the user interface module 40 and the network simulator 56. The job manager 96 includes an alert notifier 98 and a job scheduler 100. In those embodiments where the security analysis program 14 operates as a server in a client-server arrangement, the job manager 96 facilitates the scheduling and execution of unattended analysis processes. The job scheduler 100 schedules the jobs and the alert notifier 98 generates alerts regarding the status of the jobs.

At some point, either before or after the user launches the security analysis program 14, the device adaptors 90, 92 and 94 retrieve configuration information from their respective devices 91, 93 and 95. Examples of configuration information collected include access control rules, authentication rules, and rules for checking the integrity of the data. The device adapter can obtain this sort of data in the form of firewall rules stored in the device with which it is associated. The device adapter uses the interface expected by the device as well as the set of management commands expected by the device. The expected interface and expected management commands may depend on the manufacturer and model of the device. Thus, the device adapters may be configured to handle particular manufacturers and particular models. For example, if the device 93 is a Cisco 870 Series router, then the device adapter 92 would communicate with it using Telnet, Simple Network Management Protocol (SNMP), Command Line Interface (CLI) or Hypertext Transport Protocol (HTTP), and would use a set of management commands that the Cisco 870 Series router recognizes.

Referring to FIG. 2, when the user launches the security analysis program 14, the user interface module 40 requests data regarding the current topology of the network 10 (FIG. 1) from the repository manager 54. The repository manager 54 obtains this data from the topologies database 58. The user interface module 40 also makes a call to the network simulator 56, which provides simulation data for the network 10 to the user interface module 40. The repository manager 54 provides the topology data to the user interface module 40.

Figure 3:
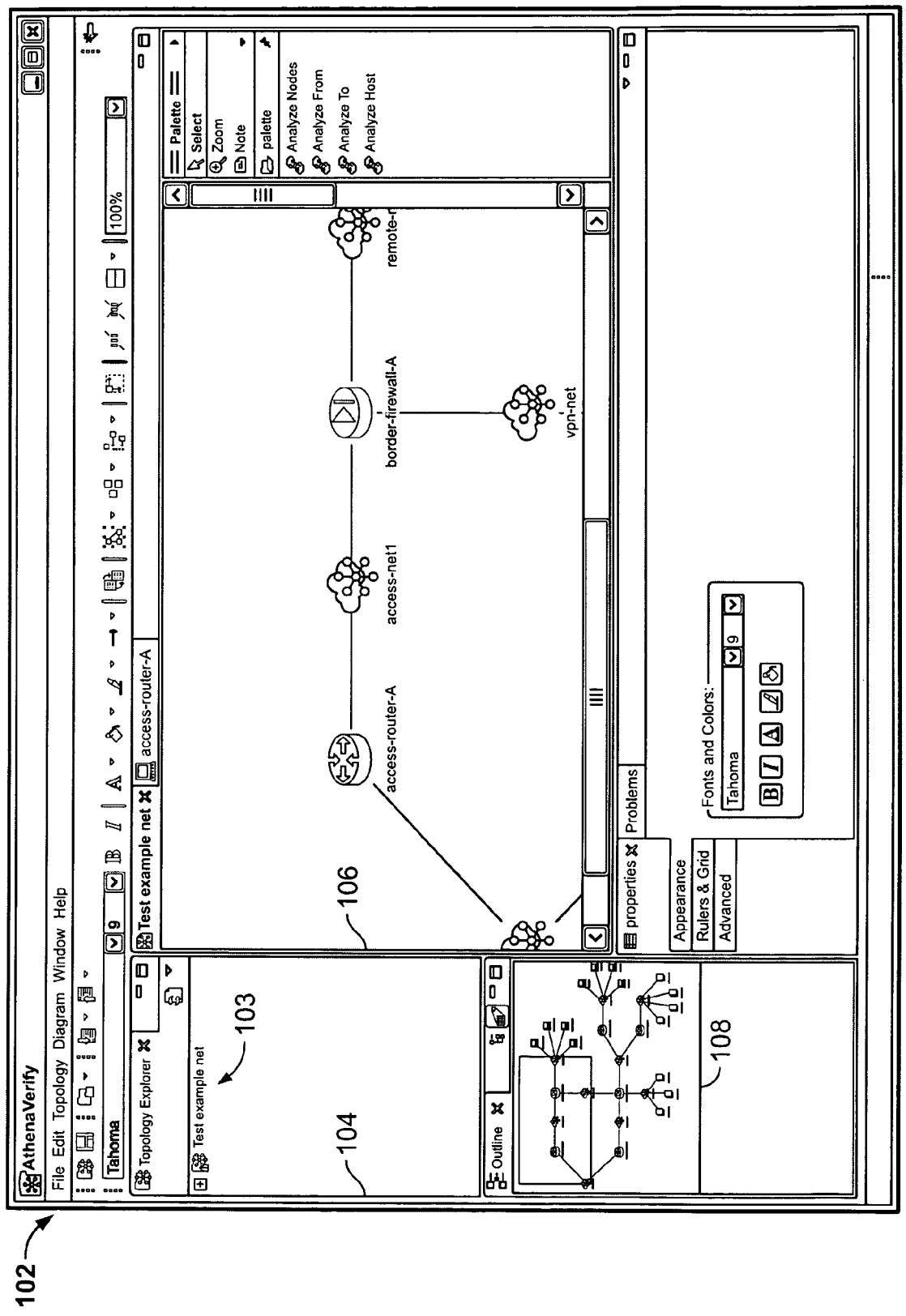
FIGS. 3-8 illustrate various aspects of a user interface for a security analysis program according to an embodiment of the invention.
Figure 4:
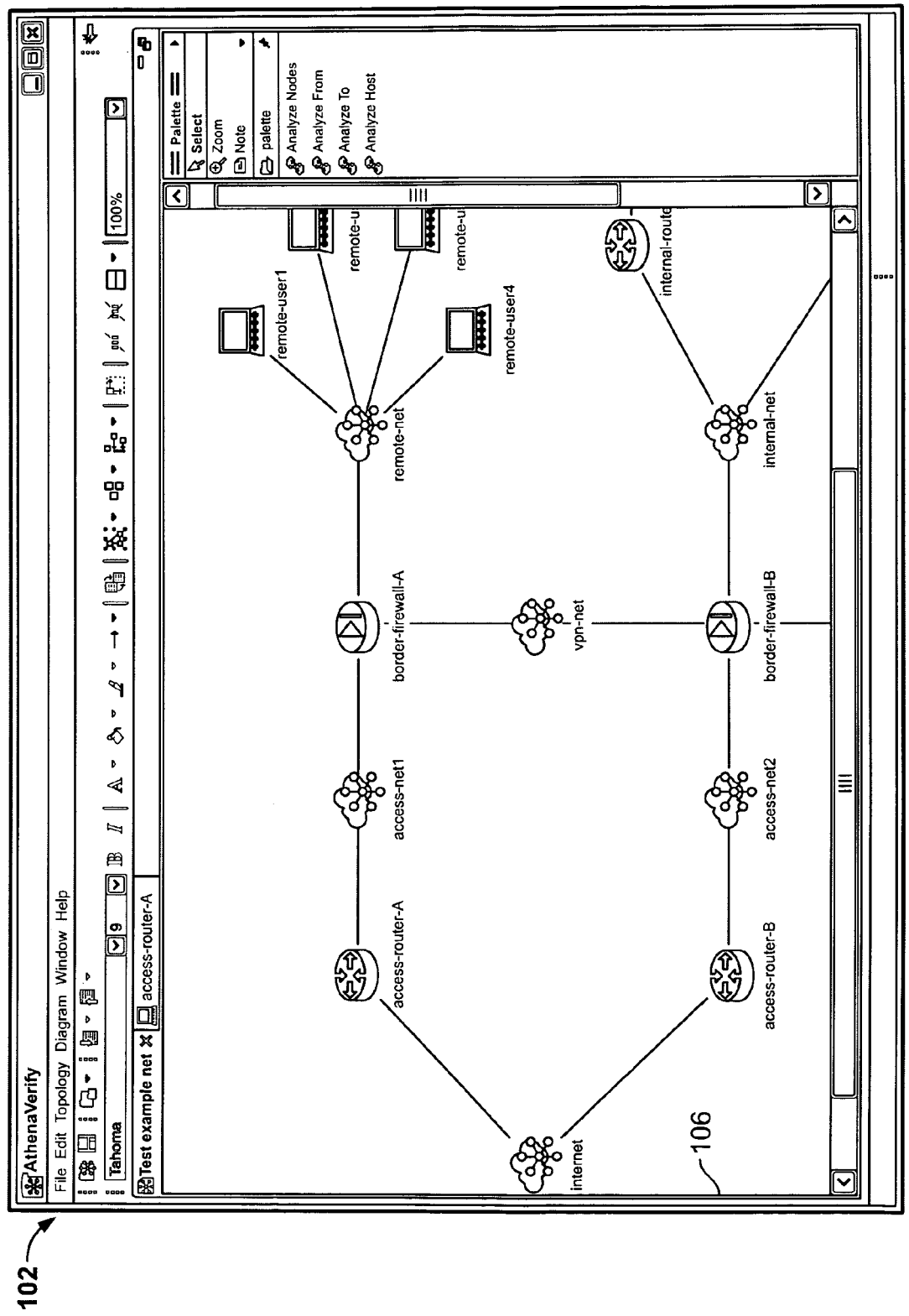

Referring to FIG. 3, a user interface that may be used in an embodiment of the invention will now be described. The user interface, generally labeled 102, displays an expandable tree 103 in a first pane 104. In a second pane 106 of the user interface 102, the security analyzer program 14, displays a diagram of the topology of the network. The user interface 102 also displays a miniature representation of the topology of the network 10 in a third pane 108. Any of the panes of the user interface 102 may be resized. For example, FIG. 4 shows the user interface 102 with the second pane 106 enlarged.

Figure 5:
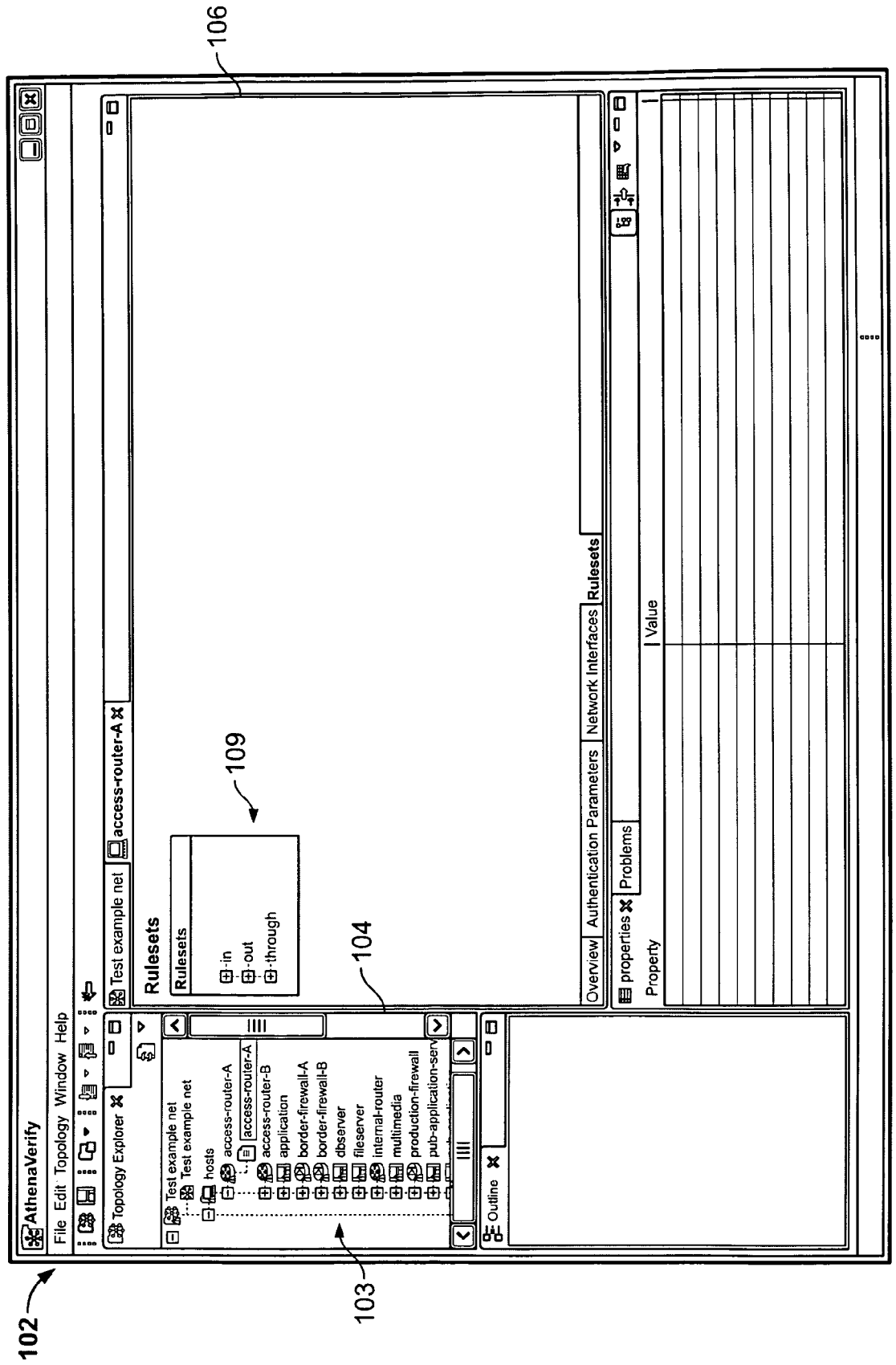
Figure 6:
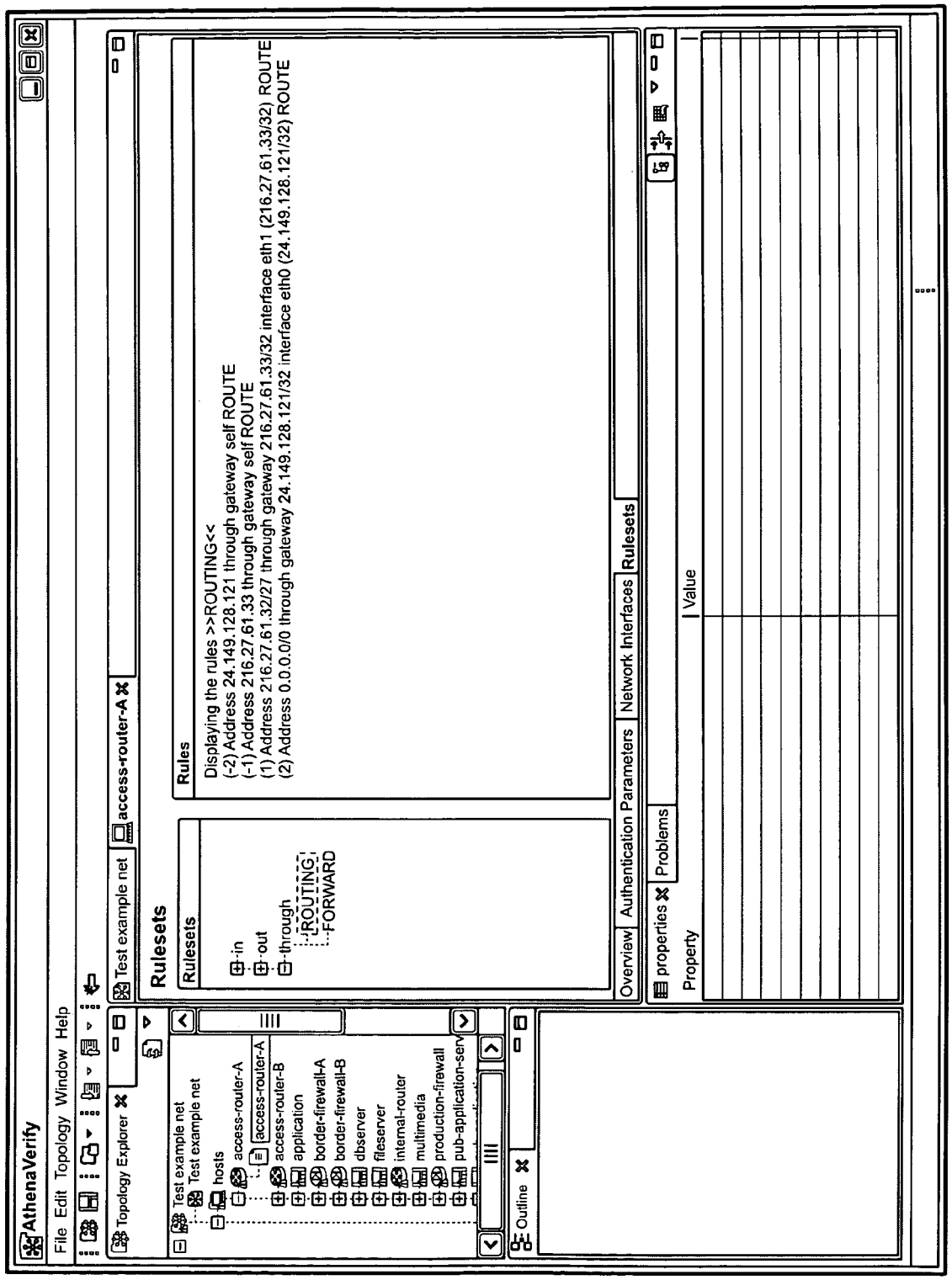

The tree 103 in the first pane 104 includes branches and leaves that represent various devices in the network 10 (FIG. 1). Referring to FIG. 5, if the user selects one of the devices, a "rulesets" tree 109 appears in the second pane 106. The rulesets tree 109 represents the sets of rules that the selected device enforces to admit or deny the passage of network traffic in, out or through the device. The ruleset tree 109 can be expanded. Referring to FIG. 6, for example, the user has selected "access-router A" from the first pane 104. The rules for that router are displayed next to the rulesets tree 109. Note that the router itself may not necessarily express the rules in the same way as they are expressed in the rulesets tree 109. In fact, in an embodiment of the invention, the device adapter for access-router A extracts the rules from access-router A in whatever format access-router A maintains them, and converts them into a canonical ruleset language.

Figure 7:
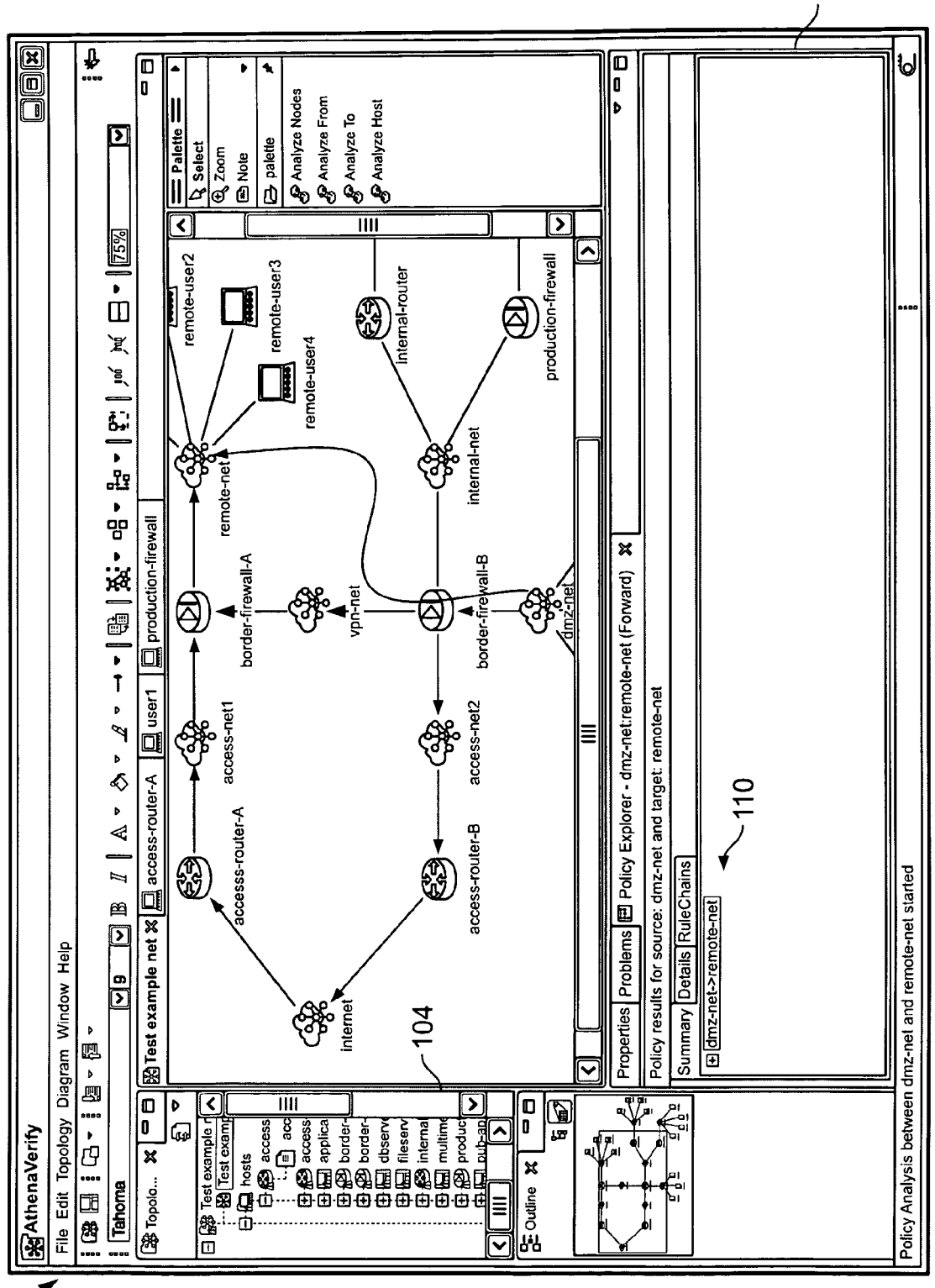
Figure 18:
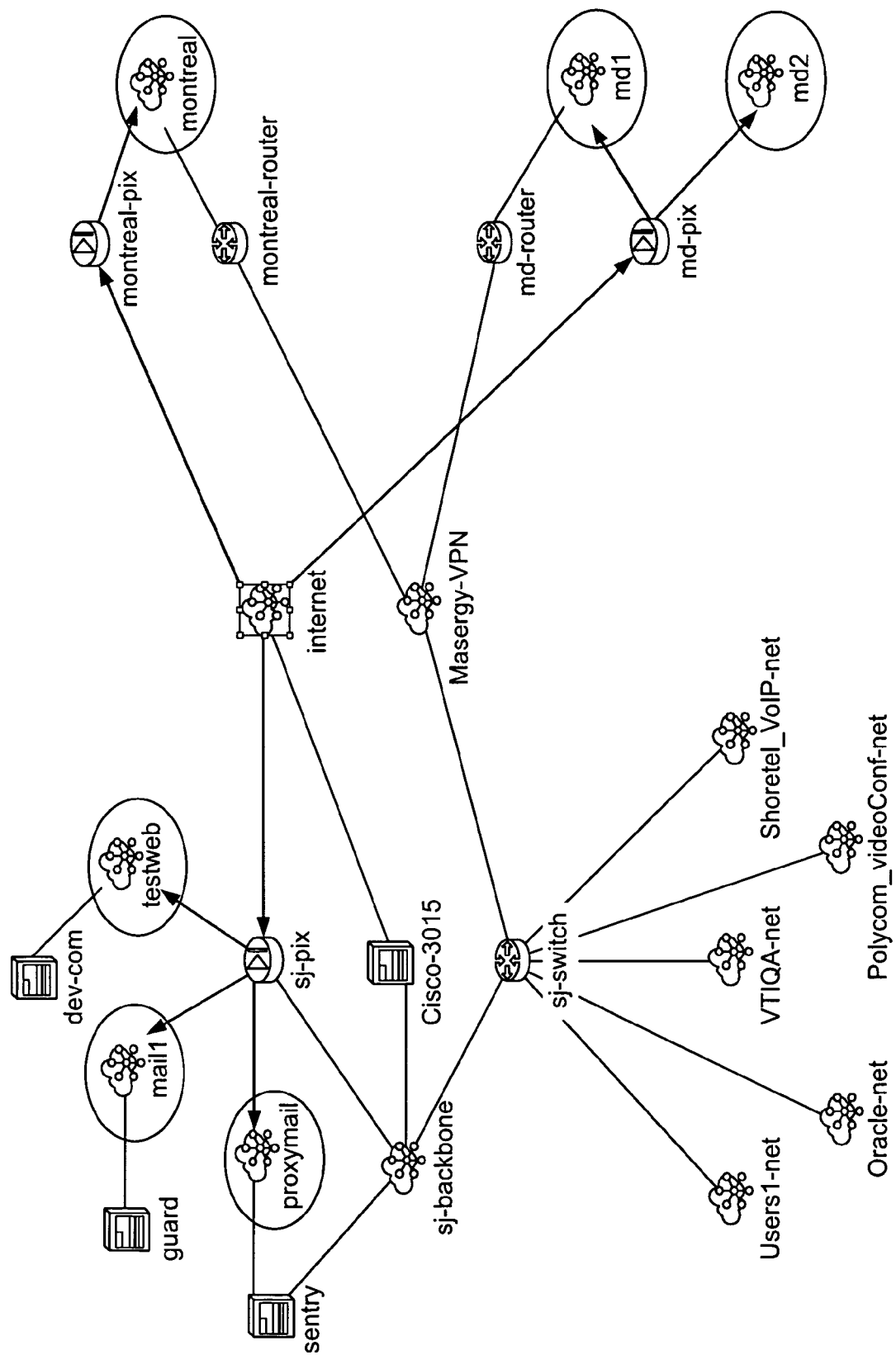

Referring to FIG. 7, a user can, in an embodiment of the invention, determine the effective security policy for roundtrip or one way communication between nodes of the network 10—e.g., 1-to-1 nodes, 1-to-n nodes, or n-to-1 nodes. To do so, the user selects one of the two nodes, then clicks, as appropriate, the "Analyze Nodes" button (for 1-to-1), "Analyze from" button (for 1-to-n), or the "Analyze to" button (for n-to-1). An arrow then appears as originating from the selected node or set of nodes. The user then selects the second node or set of nodes. The security analysis program 14 (FIGS. 1 & 2) then calculates the effective policy from the first set of nodes to the second set of nodes. In FIG. 7, the first node is "dmz-net" and the second node is "remote-net." The network diagram (in the second pane 106) displays an arrow (or arrows) from the first set of nodes to the second set of nodes. FIG. 18 shows an example of a 1-to-n selection by the user, in which the user has requested that the effective policy from the interne to several nodes and sub-networks. Such an analysis may be useful when trying to identify vulnerabilities from outside of the network 10 (FIG. 1).

Figure 8:
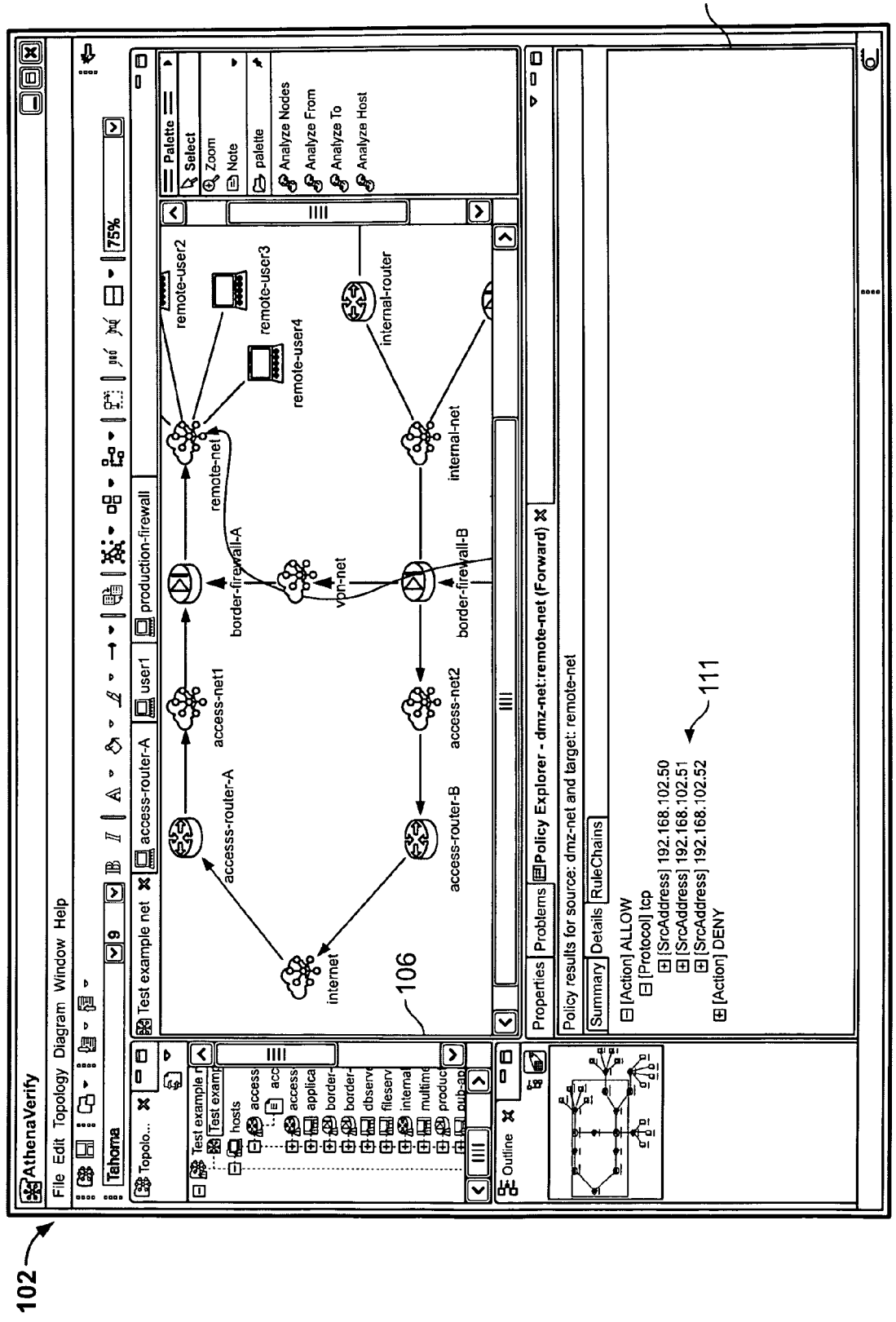

Referring still to FIG. 7, if the user clicks on the "Summary" tab, the security analysis program 14 (FIG. 1) displays a tree 110 representing each of the possible communications paths between the two nodes (or between one node and n nodes) in a fourth pane 113. More specifically, each leaf in the tree represents a path by which at least some network traffic is allowed. Conversely, for each such path, there is a corresponding leaf. The user may then select one of the leaves of the tree 110 and click the "Details" tab. Referring to FIG. 8, the security analysis program 14 responds by displaying details regarding the selected leaf—i.e., details regarding the effective policy for the path represented by the leaf. These details are depicted in a third pane 113 in the form of a policy tree 111. If the user selects a leaf (i.e., a policy) from the policy tree 111 and clicks on the "Rule Chains" tab, the security analysis program 14 (FIG. 2) queries the repository manager 54, which, in turn, queries the device manager 88. The device manager 88 obtains the appropriate rule sets from the device adapter (the via the appropriate device channel 85). The security analysis program 14 then displays the obtained rule sets in the first pane 120 of the user interface window. The rules are broken down by address range.

Figure 19:
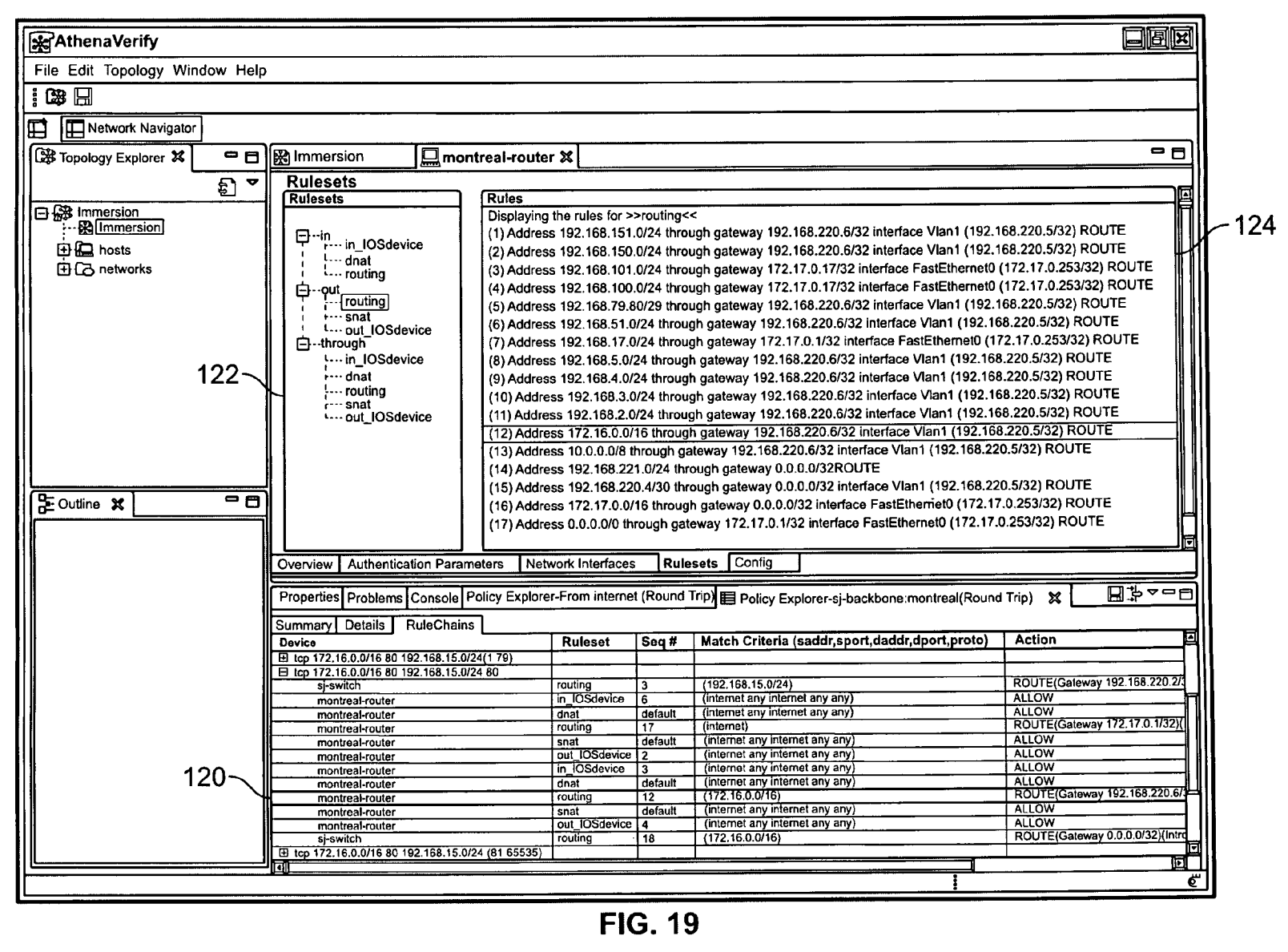
Figure 20:
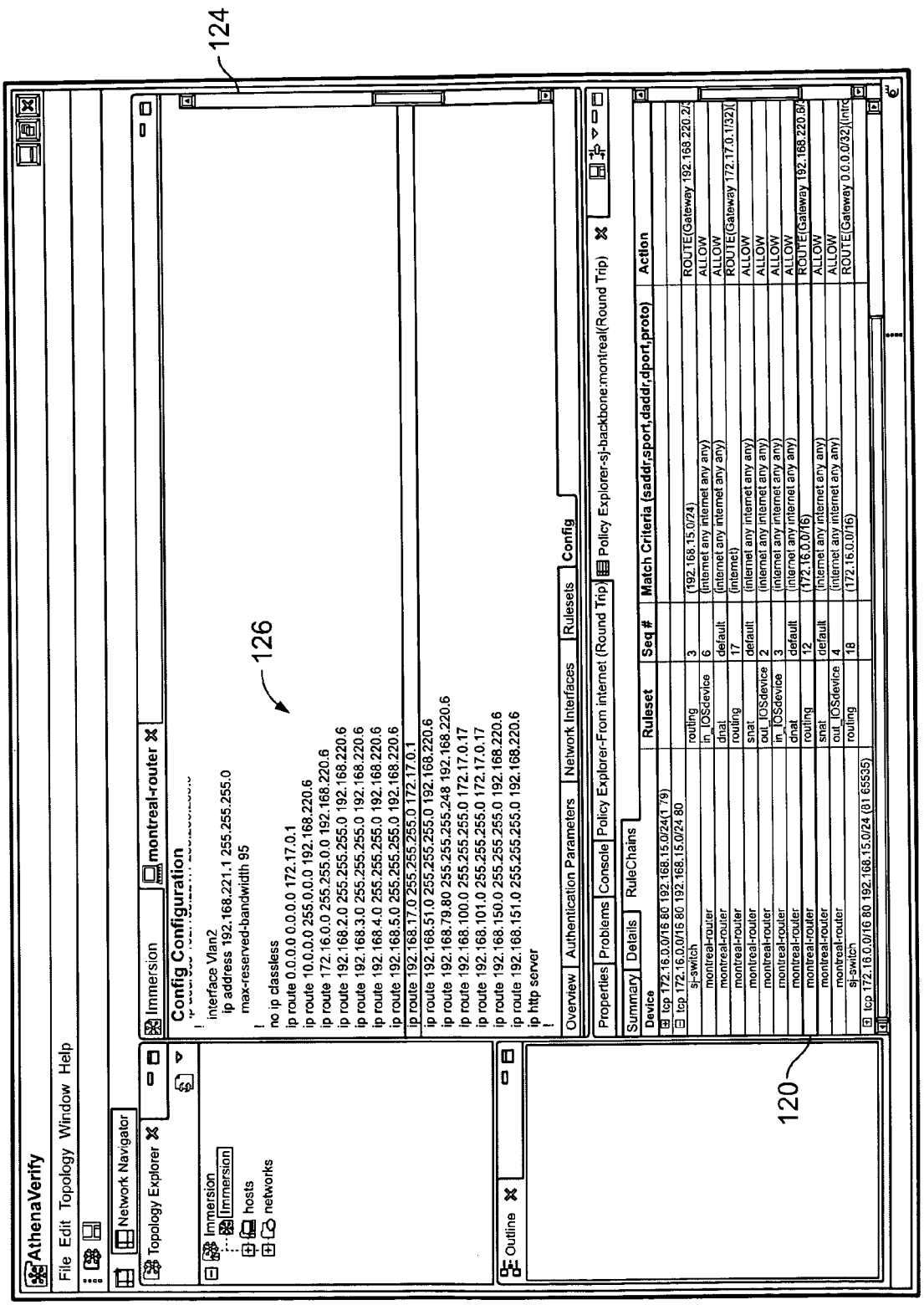

As shown in FIGS. 19 & 20, the user can select one of the rules and, in response, the security analysis program 14 will display the raw settings 126 in a fourth pane 124. The user may then edit the raw settings 126. The user may then edit the raw settings on the user interface. The changes are then transmitted to the device via the device channel. One the device settings have been updated, the user may then rerun an analysis of the various paths of the network 10 to determine what change or changes in the effective policies of the network 10 have occurred as a result of the configuration change.

Figure 9:
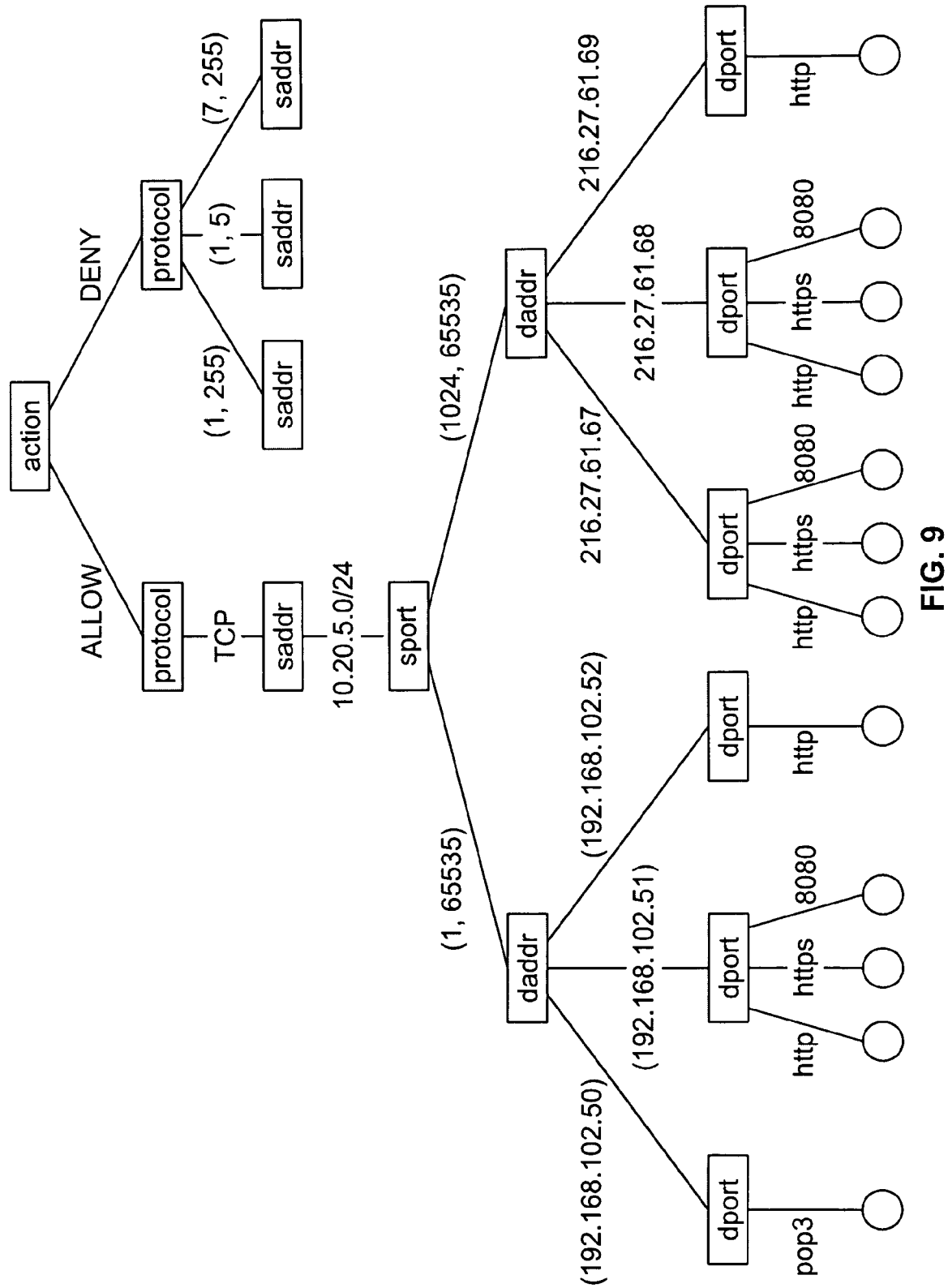
FIG. 9 illustrates a conceptual view of policy tree according to an embodiment of the invention.

In an embodiment of the invention, the effective policy between two nodes in the network 10 is expressed in terms of five criteria: network protocol, source address, source port, destination address, and destination port. These criteria may be ordered by the user in whatever way the user finds the most useful. The effective policy is then expressed as a tree, whose hierarchy is determined by the order imposed by the user. To illustrate, reference is made to FIG. 9, in which a conceptual view of a policy tree according to an embodiment of the invention is shown. The tree represents a policy between two nodes in which the five criteria are ordered as follows: (1) network protocol, (2) source address, (3) source port, (4) destination address, and (5) destination port.

There are many possible ways in which the security analysis program 14 (FIGS. 1 and 2) can calculate the effective network policy between nodes of a network. The way in which any particular implementation of the invention accomplishes this is based in part on how the devices of the network are modeled. According to one embodiment, each of the devices of the network 10 (FIG. 1) is modeled as described in "A Reference Model for Firewall Technology," by Christoph Schuba, Bryan Lyles, and Eugene Spafford and presented at the SPARTAN Symposium, March 1997. In this embodiment, however, the reference model is extended to represent security policies of multiple devices on the network 10 as a unitary policy, or, conversely, to decompose a single policy into multiple enforcement functions across the network 10. Extending the reference model across multiple devices in this embodiment is accomplished by determining the "reachability" of nodes in the network 10, as discussed in "On Static Reachability Analysis of IP Networks" by Geoffrey G. Xie, et al. and published in the proceedings of the IEEE Infocom '05 in March 2005.

Referring to FIG. 10, a text view of a policy tree is shown. As in the conceptual view of FIG. 9, the text view of FIG. 10 has the five criteria ordered by network protocol, source address, source port, destination address and destination port (in that order). Note that destination port ("DstPort" in FIG. 9) can be expressed in terms of a logical port number (such as 8080) or in terms of a service (such as http, which equates to port 80). The text view of the tree is shown in the way it would appear in the user interface 102 (FIG. 3). In this view, the user can quickly look and determine which protocols are permitted, and which source addresses are allowed to receive network traffic for those protocols. But the user may wish instead to focus on which services are permitted for that protocol, and thus may wish to user the following hierarchy in the tree: (1) network protocol ("protocol"), (2) destination port, (3) destination address, (4) source port, and (5) source address. The tree of FIG. 10 would then look like the one shown in FIG. 11.

Figure 12:
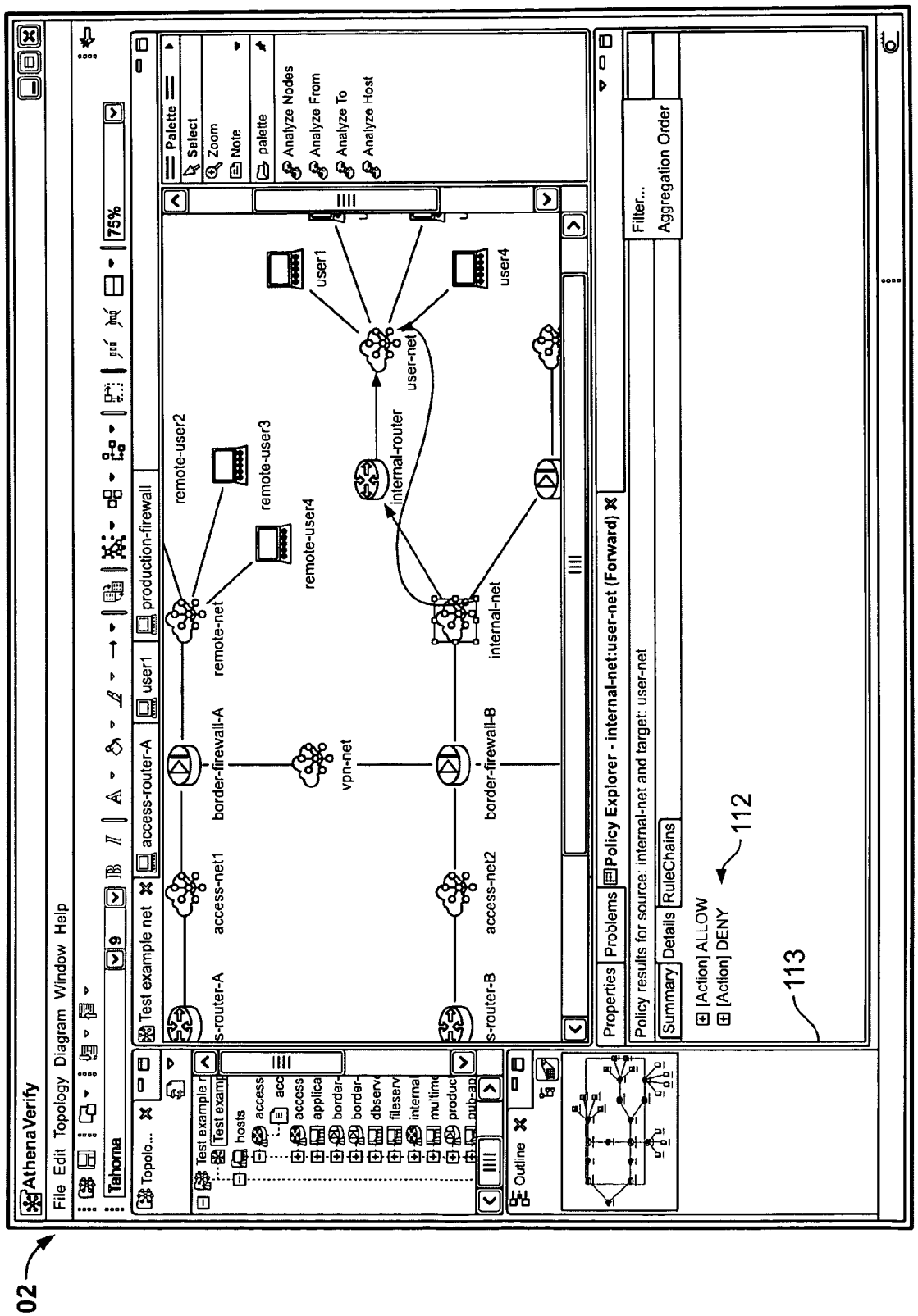

Turning to FIG. 12, the user interface 102 is shown once again. In this figure, the "FORWARD" route between "internal-net" and "user-net" has been selected. Furthermore, the effective policy from internal-net to user-net has been calculated by the security analysis program. An expandable policy tree 112 representing this effective policy is shown in the fourth pane 113. Expanding the "ALLOW" branch of the policy tree 112 reveals only packets using the network protocol TCP are allowed to travel from dmz-net to remote-net.

Figure 13:
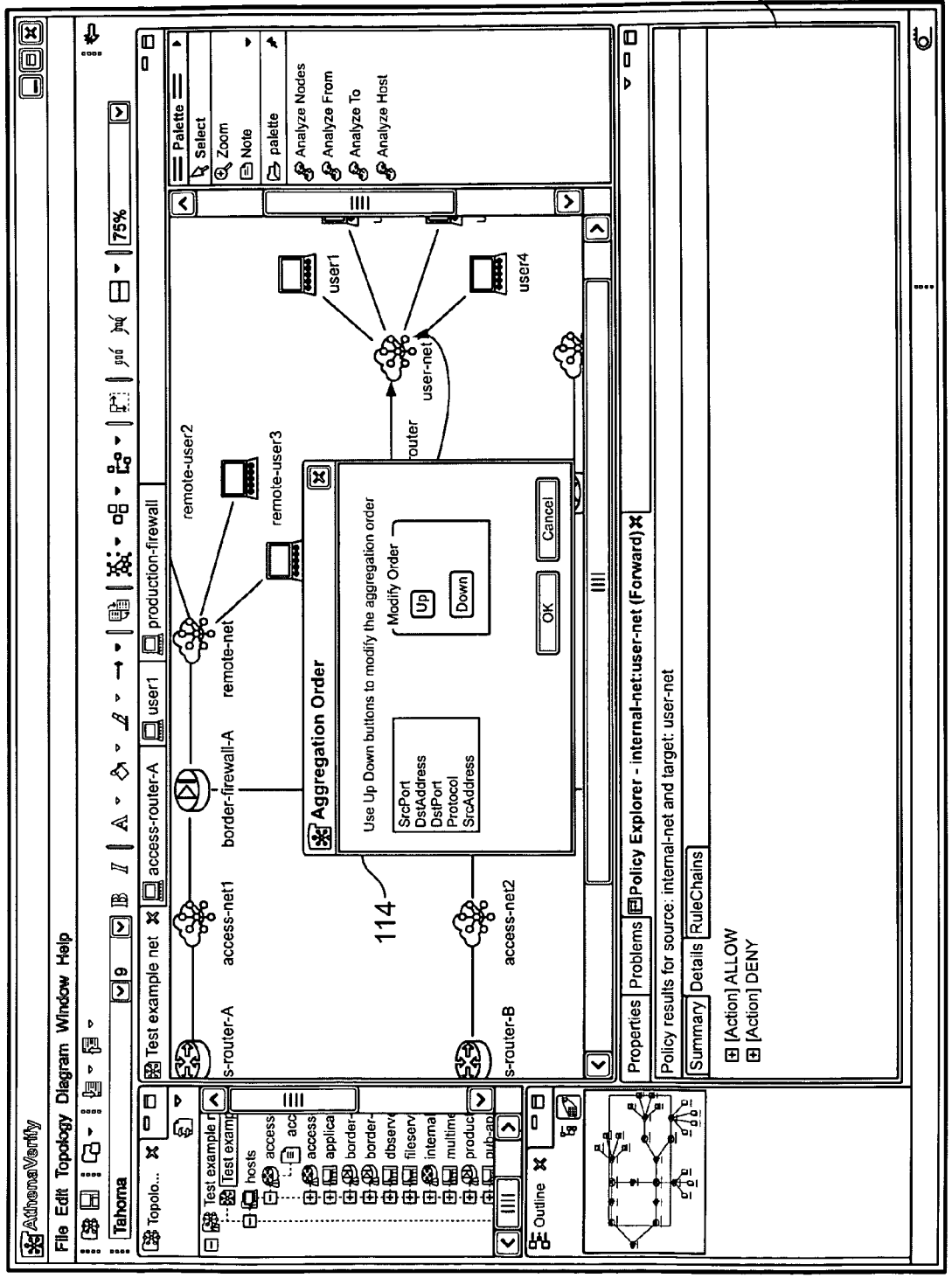
Figure 14:
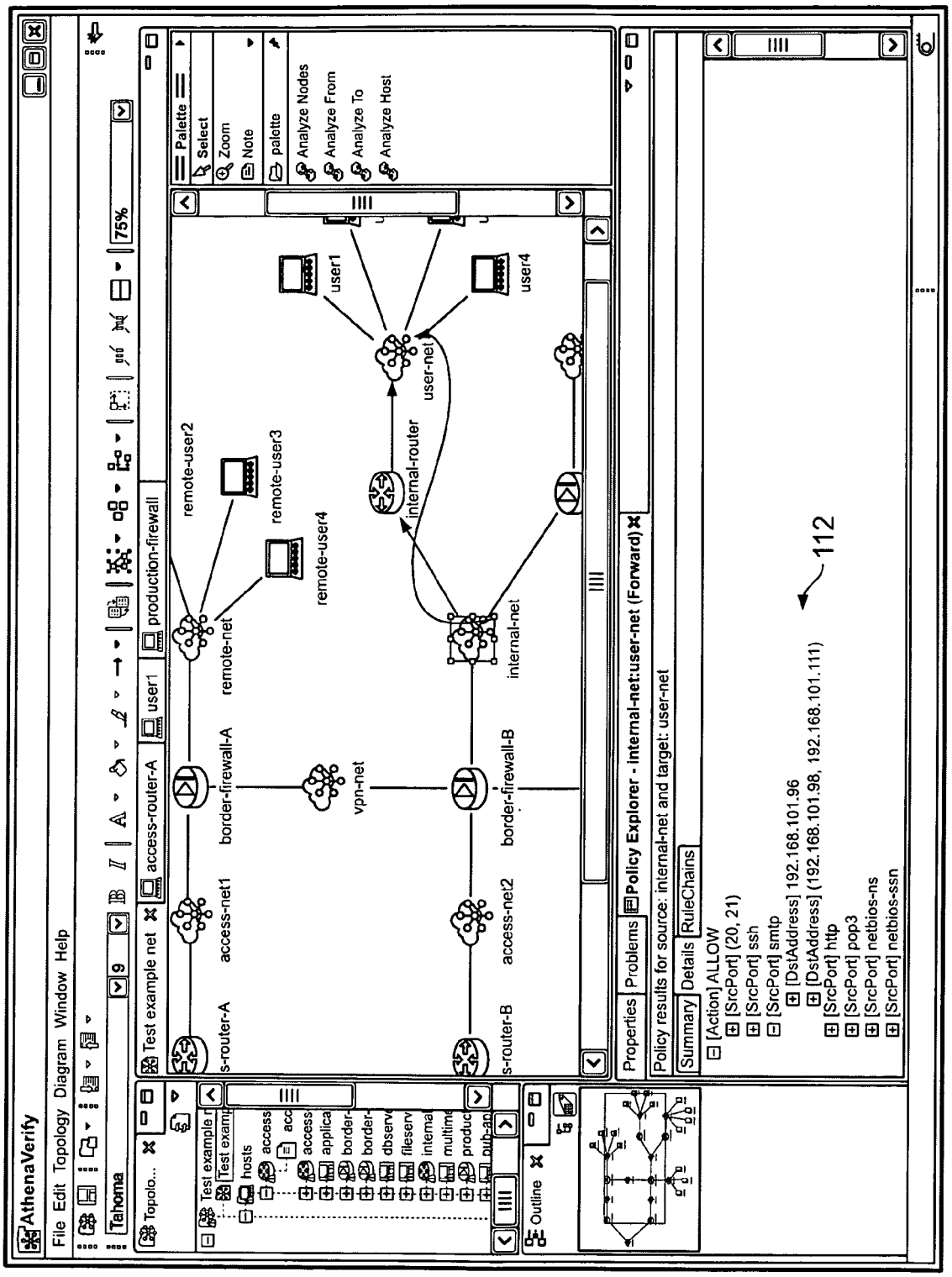
Figure 15:
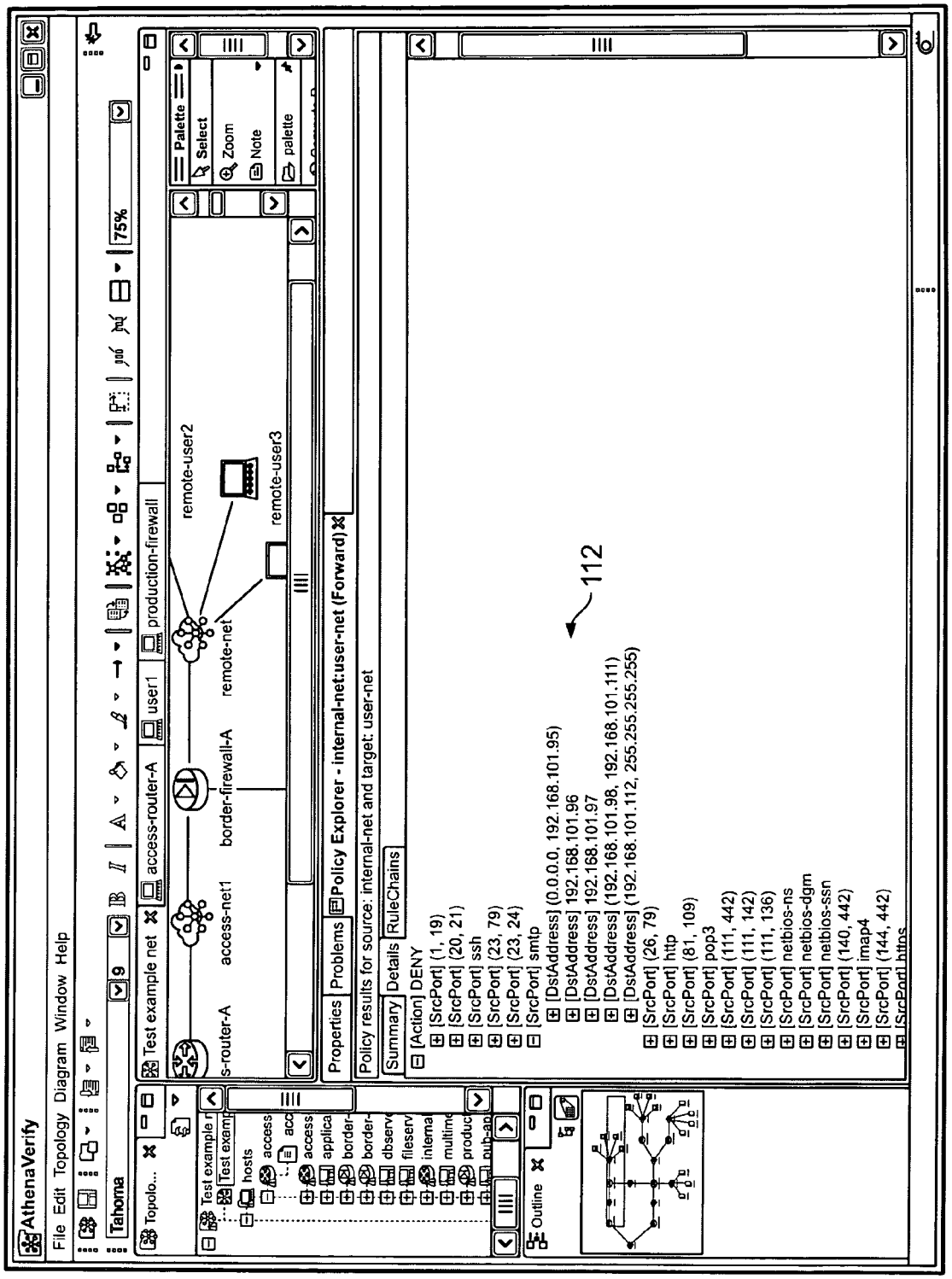

Referring to FIG. 13, an example of how a user reorders the policy criteria will now be described. In this example, the user right-clicks on the fourth pane 113 and selects "Change Aggregation Order" from a pop-up menu. The policy criteria are then displaying in a pop-up window 114. The user may then promote or demote the various criteria. In the example shown in FIG. 12, the user has ordered the policy criteria as follows: (1) source port, (2) destination address, (3) destination port, (4) protocol and (5) source address. An expanded view of the DENY branch of the policy tree 112 after reordering is shown in FIGS. 14 and 15.

Figure 16:
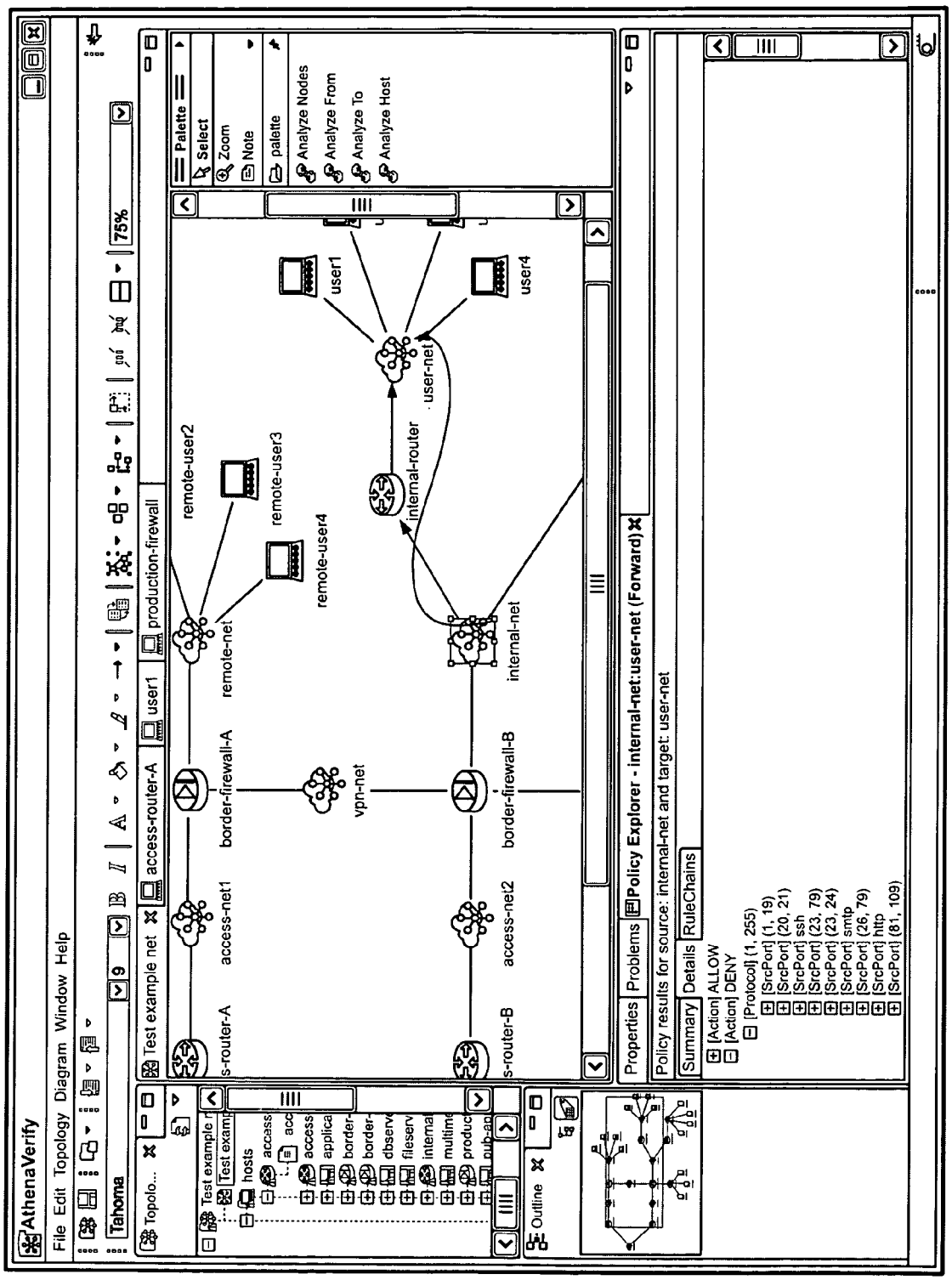
Figure 17:
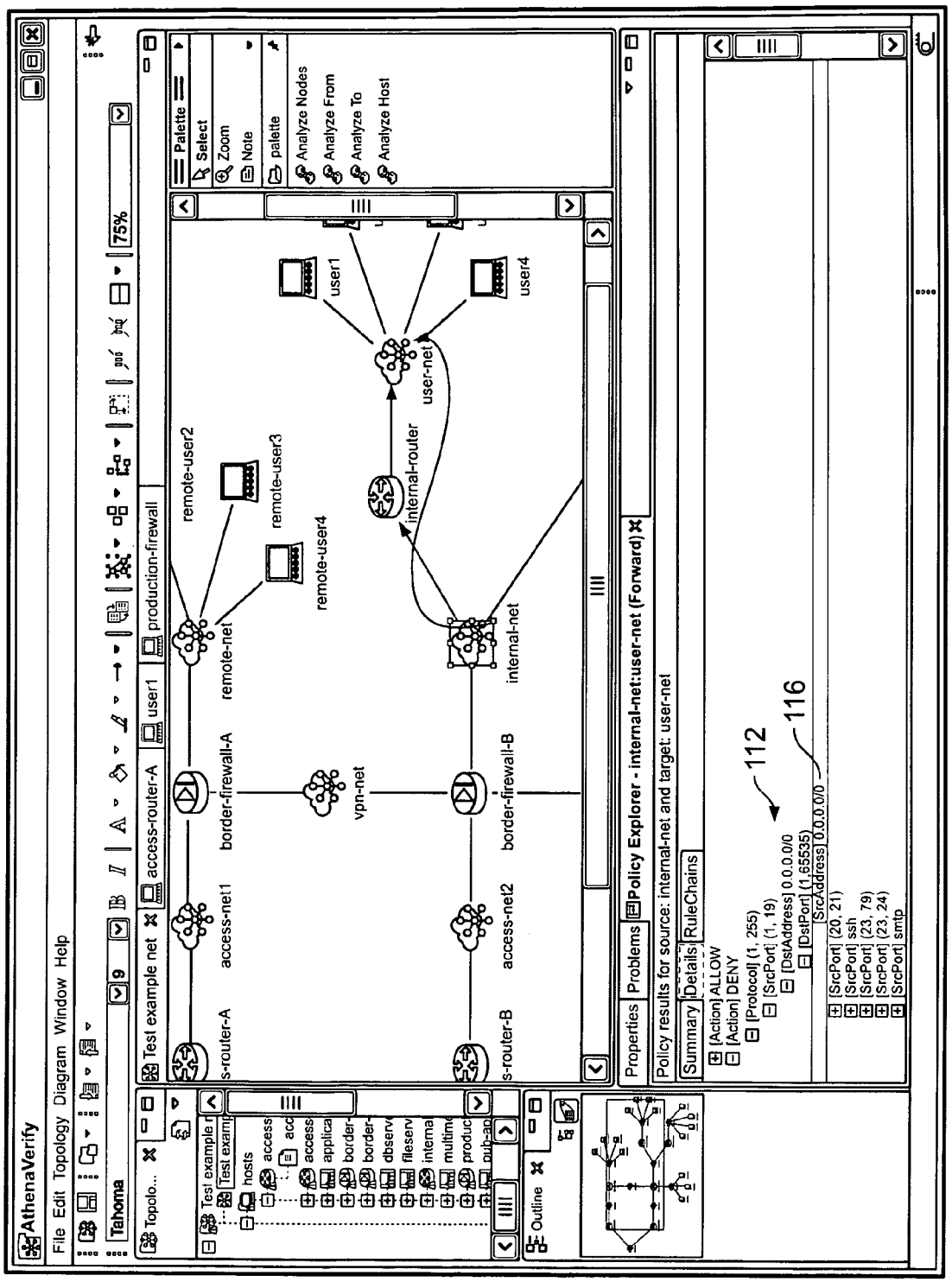

Referring to FIGS. 16 and 17, the policy tree 112 will be discussed in more detail. In FIGS. 16 and 17, the policy criteria are back to the original ordering of FIG. 11, and the DENY branch of the policy tree 112 is shown in the third pane 108. As can be seen in FIG. 16, one of the sub-branches of the DENY branch has been expanded down to a leaf 116. According to this branch, the data traffic that is to be denied includes all protocols (protocols 1 though 255) having a source port of 1 through 19, having a destination address of 0.0.0.0/0 and having a source address of 0.0.0.0/0. A filter may also be applied to the policy tree so as to allow the user to focus on certain aspects of the security policy. The filter may be applied based on any of the five policy criteria. For example, if the user only wishes to know which HTTP requests are being allowed from internal-net to user-net, then the user would apply a filter that showed only those parts of the policy tree that relate to communications whose source port is 80 (the HTTP port).

According to an embodiment of the invention, the security analysis program 14 (FIGS. 1 & 2) keeps track of changes that occur in the effective policy of the network. It does so by using the difference comparator 70 and the policies database 60. The changes can be shown, for example, by displaying a side-by-side comparison of the "old" effective policy with the "new" effective policy, and using underlining, strikethroughs, shading and coloring to indicate which branches or leaves of the policy tree have been added, deleted or changed. Thus, when the topology of the network changes, the resulting changes in the effective security policy of the network are reflected. These changes may then be stored in the policies database 60. Over time, the security analysis 14 compiles an audit trail of the various changes in the network and their impact on the effective security policy of the network.

According to an embodiment of the invention, the security analysis program 14 (FIG. 1) compares the effective security policy of the network 10 to known vulnerabilities stored in the vulnerability rules database 64 (FIG. 2) to conduct a vulnerability analysis of the network 10.

Referring to FIGS. 17-20, another possible feature of the invention will now be described. According to this feature, the user may select, via the user interface, a node or sub-network and, by clicking the "Analyze Host" button, cause the security analysis program 14 to display the security corresponding to the selected host. For example, if the user selects the host "montreal-router" (seen in FIG. 18), the security analysis program 14 (FIG. 2) queries the repository manager 54, which, in turn, queries the device manager 88. The device manager obtains the effective policy from the device adapter representing the host "montreal-router." If the user clicks on the "Summary," "Details," or "Rule Chains" tabs, the security analysis program 14 displays the information described above, except that because only a single device is being analyzed (instead of the effective policy between two or more devices), the policy that gets displayed is simply the policy between each combination of input and output interfaces of the device.

It can be seen from the foregoing that a new and useful method and system for analyzing the security of a network has been described. The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

We claim:

1. A method for analyzing security of a computer network, the method comprising:
   collecting security configuration settings from each of a plurality of nodes of the computer network, for each node:
   opening a communication session with the node;
   querying the node using the communication session to determine the node's security configurations settings; and
   obtaining rules that each of the nodes uses to admit or deny network traffic;
   graphically displaying topology of the network on a user interface by displaying a representation for each of the nodes on the network and displaying connections between the representations, the connections being representative of communication paths between each of the nodes;
   receiving, from a user, a selection of a first representation of a first node of the plurality of nodes and a second representation of a second node of the plurality of nodes;
   displaying a plurality of rules for each of the first and second nodes, the rules indicating a plurality of criteria by which each of the nodes admits or denies traffic on the network;
   analyzing the security configuration settings;
   generating a security path policy for along each of all possible communications paths between the first and second nodes based on the results of the analyzing step, the generating step further comprising:
   determining an aggregate effect of the security settings of each of the devices along each of the possible communications paths between the first and second nodes;
   expressing the generated security path policy in the form of a canonical ruleset language;
   displaying a plurality of rules including all rules for all nodes comprising the aggregate effect of the generated security path policy, the rules indicating a plurality of criteria by which each of the nodes admits or denies traffic on the network; and
   displaying the generated security path policy on the user interface.

2. The method of claim 1, wherein the communication session is opened using a protocol selected from a group consisting of telnet, secure shell (SSH), and Simple Network Management Protocol (SNMP).

3. The method of claim 1, wherein at least one of the plurality of nodes acts as a network control device that is a firewall, router, layer 3 switch, or other network control device, and wherein the collecting step comprises:
   executing a device adapter that corresponds to the manufacturer and model of the network control device;
   the device adapter opening the communication session with the network control device;
   the device adapter obtaining, from the network control device, the rules that the network control device uses to admit or deny network traffic; and
   converting the security configuration settings into a set of canonical rules, wherein the step of generating the security path policy utilizes the canonical rules.

4. The method of claim 1, wherein the graphically displaying step comprises displaying an icon as the representation for each of the nodes on the network and displaying lines as the connections between the icons, the lines being representative of communication paths between the nodes.

5. The method of claim 1, wherein the security path policy is an inter-node communication policy and comprises a set of multiple tuples, where each tuple comprises the following elements: network protocol, source address, source port, destination address, and destination port.

6. The method of claim 1, further comprising presenting the user with an element for node selection comprising entering a 1-to-1, 1-to-n, or n-to-1 node relationship for one or more source nodes and one or more destination nodes.

7. A method for analyzing security of a computer network, the method comprising:
   collecting security configuration settings from a plurality of nodes of the computer network, for each node:
   opening a communication session with the node;
   querying the node using the communication session to determine the node's security configuration settings; and
   obtaining rules that each of the nodes uses to admit or deny network traffic;
   graphically displaying topology of the network on a user interface by displaying a representation for each of the nodes on the network and displaying connections between the representations, the connections being representative of communication paths between each of the nodes;
   receiving, from a user, a selection of a first representation of a first node of the plurality of nodes and a second representation of a second node of the plurality of nodes;
   analyzing the security configuration settings using a plurality of criteria;
   generating a security path policy for along each of all possible communication paths between the first and second nodes based on the results of the analyzing step, the generating step further comprising:
   determining an aggregate effect of the security settings of each of the devices along each of the possible communications paths between the first and second nodes;
   expressing the generated security path policy in terms of the plurality of criteria;
   displaying a plurality of rules including all rules for all nodes comprising the aggregate effect of the generated security path policy, the rules indicating a plurality of criteria by which each of the nodes admits or denies traffic on the network;
   graphically representing the generated security path policy as a hierarchy, wherein each of the plurality of criteria occupies a level in the hierarchy;
   receiving a user request to reorder the plurality of criteria within the hierarchy; and
   based on the user request, repeating the graphically representing step using the reordered plurality of criteria.

8. The method of claim 7, wherein the plurality of criteria include a source address and a source port of the communication.

9. The method of claim 7, wherein the plurality of criteria include a destination address and a destination port of the communication.

10. The method of claim 7, wherein the plurality of criteria include a communications protocol.

11. The method of claim 7, wherein:
the security path policy is an inter-node communication policy and comprises a set of multiple tuples, wherein each tuple comprises a plurality of elements;
a number of levels in the hierarchical tree corresponds to a number of elements in a tuple;
each tree element at a given level corresponds with a unique value of the element within the tuple; and
a relationship between the hierarchical tree order and the tuple element order can be varied by the user;
the graphically representing step comprises displaying the hierarchical tree as having branches that can be expanded or collapsed, the tree; and
the receiving step comprises receiving a user selection of a criteria of the plurality that is to be promoted or demoted.

12. A system for analyzing security of a computer network, the system comprising:
a plurality of devices communicatively linked to the computer network;
a computer communicatively linked to the computer network for collecting security configuration settings from each of the plurality of devices, the computer comprising software in a non-transient medium comprising:
a plurality of device adapters, each device adapter corresponding to a device of the plurality of devices, each device adapter performing steps comprising:
opening a communication session with the device using a communication protocol that the device is configured for; and
extracting security configuration information from the device by querying the device during the communication session, including information regarding which types of communication the device allows and which types of communication the device denies;
a network simulator comprising software in a non-transient medium that performs steps comprising:
defining models for the plurality of devices based on the extracted security configuration information;
deriving a security path policy for communication between a first device and a second device of the plurality of devices based on the defined models, the security path policy being expressed as a set of criteria for admitting and denying communication between the first and second devices and based on an aggregate effect of the security settings of each of the plurality of devices along each possible communication path between the first and second devices;
a user interface device that graphically displays a topology of the network on the user interface device by displaying a representation for each of the devices on the network and displaying connections between the representations, the connections being representative of communication paths between the devices, and that graphically displaying a plurality of rules including all rules for all nodes comprising the aggregate effect of the generated security path policy, the rules indicating a plurality of criteria by which each of the nodes admits or denies traffic on the network;
wherein the user interface device comprises a user interface module that performs steps comprising:
receiving a user's selection of the first device and the second device;
displaying, to the user, the derived security path policy in a form of a tree, the tree being structured based rank order of the criteria;
receiving, from the user, a request to change the rank order of the criteria; and
re-displaying the tree to the user based on the changed rank order.

13. The system of claim 12, wherein the device includes a network control device that includes a firewall, a router, a layer 3 switch, or other network control element, and the extracted security configuration information includes the allow and deny rules for the network control device.

14. The system of claim 12, wherein the criteria includes the source address, the source port, the destination address, the destination port, and the transport protocol used for the communication between the first device and the second device.

15. The system of claim 12, wherein the user interface module performs further steps comprising:
receiving from the user an request to filter out elements of the security policy based on a specific value for a criteria of the set of criteria; and
re-displaying the tree so that it only contains elements that meet the specified value for the criteria.

16. The system of claim 12, wherein the communication session is conducted using a protocol selected from the group consisting of telnet, hypertext transport protocol, command line interface, and simple network management protocol.

* * * * *